US010986080B1

United States Patent
Huang et al.

(10) Patent No.: US 10,986,080 B1
(45) Date of Patent: Apr. 20, 2021

(54) PERMISSION MANAGEMENT METHOD AND SYSTEM FOR TRUSTWORTHINESS MECHANISM OF BIG-DATA BLOCKCHAIN

(71) Applicant: PEKING UNIVERSITY, Beijing (CN)

(72) Inventors: Gang Huang, Beijing (CN); Xuanzhe Liu, Beijing (CN); Huaqian Cai, Beijing (CN); Lingxuan Hu, Beijing (CN); Hai'ou Jiang, Beijing (CN)

(73) Assignee: PEKING UNIVERSITY, Beijing (CN)

( * ) Notice: Subject to any disclaimer, the term of this patent is extended or adjusted under 35 U.S.C. 154(b) by 0 days.

(21) Appl. No.: 17/148,112

(22) Filed: Jan. 13, 2021

(30) Foreign Application Priority Data

Aug. 12, 2020 (CN) .......................... 202010809486.9

(51) Int. Cl.
*H04L 29/06* (2006.01)
*H04L 29/08* (2006.01)

(52) U.S. Cl.
CPC .......... *H04L 63/08* (2013.01); *H04L 63/0442* (2013.01); *H04L 63/101* (2013.01); *H04L 63/102* (2013.01); *H04L 63/105* (2013.01); *H04L 67/22* (2013.01)

(58) Field of Classification Search
CPC ... H04L 63/08; H04L 63/0442; H04L 63/101; H04L 63/102; H04L 63/105; H04L 67/22
See application file for complete search history.

(56) References Cited

U.S. PATENT DOCUMENTS

| 2019/0013948 | A1* | 1/2019 | Mercuri | H04L 9/0643 |
| 2019/0238550 | A1* | 8/2019 | Zhang | H04L 63/105 |
| 2020/0272755 | A1* | 8/2020 | Soundararajan | G06Q 20/06 |
| 2020/0344233 | A1* | 10/2020 | Lai | G06Q 20/0855 |
| 2020/0409940 | A1* | 12/2020 | Gu | G06F 11/3006 |
| 2021/0006400 | A1* | 1/2021 | Hu | H04L 9/3239 |
| 2021/0036860 | A1* | 2/2021 | Ranganathan | H04L 9/3234 |

* cited by examiner

*Primary Examiner* — Shin-Hon (Eric) Chen
(74) *Attorney, Agent, or Firm* — Bayramoglu Law Offices LLC

(57) ABSTRACT

A permission management method for a trustworthiness mechanism of a big-data blockchain includes: dividing system resources into user-role resources, data resources and node resources; acquiring a current role of a user based on a RBAC module in a R-TBAC model, and acquiring an operating-permission-value range of the current role; monitoring an operating behavior of the user in an operating system, and, based on the RBAC module and according to the operating-permission-value range of the current role, detecting whether the current role of the user has a role-operating permission for the operation; detecting a task-operating permission of the contract instance or task instance based on a TBAC module in the R-TBAC model during running of the contract instance or task instance; and completing, by the user, the operation in an authorized operating permission range based on the R-TBAC model.

8 Claims, 7 Drawing Sheets

PERMISSION MANAGEMENT METHOD AND SYSTEM FOR TRUSTWORTHINESS MECHANISM OF BIG-DATA BLOCKCHAIN

CROSS REFERENCE TO THE RELATED APPLICATIONS

This application is based upon and claims priority to Chinese Patent Application No. 202010809486.9, filed on Aug. 12, 2020, the entire contents of which are incorporated herein by reference.

TECHNICAL FIELD

The disclosure relates to the field of big-data blockchain technologies, and more particularly, to a permission management method for a trustworthiness mechanism of a big-data blockchain and a permission management system for a trustworthiness mechanism of a big-data blockchain.

BACKGROUND

Access control refers to a policy that allows a specific authorized subject to access an object, and prevents providing services to unauthorized subjects at the same time. In other words, the access control manages access permissions related to a series of issues such as "who can access what kinds of data resources", "who can operate data resources" and "what operations can be performed".

In a current access control application scenario of big-data blockchains, a user may have two or more identity information, and the identity information may overlap, resulting in abnormal access authorization. Meanwhile, in addition to hardware resources such as CPU and network, operated objects also have data resources such as smart-contract log and contract-runtime information with multi-source real-time interaction. Faced with various resources of many dimensions in the big-data blockchain, an existing access control model cannot cover complicated and diverse application scenarios, cannot satisfy access control requirements among various resources, is not suitable for trusted circulation of various data resources, and have problems such as low access authorization accuracy, low permission management efficiency and insufficient data security, and the like.

SUMMARY

In light of the above problems, embodiments of the disclosure provide a permission management method for a trustworthiness mechanism of a big-data blockchain and a permission management system for a trustworthiness mechanism of a big-data blockchain that overcome the above problems or at least partially solve the above problems.

In order to solve the foregoing problems, an embodiment of the disclosure provides an permission management method for a trustworthiness mechanism of a big-data blockchain, wherein the method includes: classifying system resources in the big-data blockchain into user-role resources, data resources and node resources in advance; monitoring a login behavior of a user in an operating system of the big-data blockchain, acquiring a current role of the user based on a RBAC module in a R-TBAC model, and acquiring an operating-permission-value range of the current role of the user in the big-data blockchain; monitoring an operating behavior of the user in the big-data blockchain, and, based on the RBAC module and according to the operating-permission-value range of the current role, detecting whether the current role of the user has a role-operating permission for the operation; if the current role of the user does not have the role-operating permission, according to an operating-permission value required by the operation, reminding the user to authenticate a corresponding user role; and if the current role of the user has the role-operating permission, completing the operation, or creating and running a corresponding contract instance or task instance, wherein the contract instance is an access process of the data resources to the node resources, and the task instance is an access process of the user-role resources to the data resources; detecting a task-operating permission of the contract instance or task instance based on a TBAC module in the R-TBAC model during running of the contract instance or task instance; if the contract instance or task instance does not have the task-operating permission, applying for or adding, by the contract instance or task instance, the task-operating permission; if the contract instance or task instance has the task-operating permission, normally running the contract instance or task instance to complete the operation; and completing, by the user, the operation in authorized ranges of the role-operating permission and the task-operating permission based on the R-TBAC model; and performing, by the R-TBAC model, authorization management on mapping-relation sets in the model individually based on different dynamic constraint rules designed in advance.

Optionally, the user-role resources include: a Center Manager, a Node Manager, a Smart Contract Instance Manager, a Smart Contract Provider, a Smart Contract User and an Anonymous;

the data resources include: a smart-contract code, a contract instance, contract-runtime information and a smart-contract log; and the node resources include: a CPU, an I/O, a network and a memory.

Optionally, the monitoring the login behavior of the user in the operating system of the big-data blockchain, acquiring the current role of the user based on the RBAC module in the R-TBAC model, and acquiring the operating-permission-value range of the current role of the user in the big-data blockchain includes:

detecting by using signature authentication of the user whether the user logs in for the first time; if the user does not log in for the first time, acquiring the current role of the user from a user management database; if the user logs in for the first time, acquiring a session ID and current-public-and-private-key information, determining according to a process of current-public-and-private-key-signature verification that the user is a legal node currently, searching the public key from the user management database, and acquiring the current role of the user; and dividing the current role of the user according to the principle of least privilege of roles based on a relationship between functions provided by different users on nodes and a working process, so as to reduce overlapping and omission of operating-permission-value ranges of all roles; and if the user management database does not have the public key, storing a public key of the user into the user management database and marking the public key as a default current role to acquire the default current role of the user; and deploying the default current role in advance according to a distribution scenario of the big-data blockchain, specifically including: the Center Manager and the Node Manager;

copying the operating-permission value of the current role of the user in the big-data blockchain to the current user, so that the current user is capable of performing operations in the operating-permission-value range; and collating the operating-permission-value ranges corresponding to all the roles, so as to reduce the overlapping and omission of the operating-permission-value ranges of all the roles, including: allocating two or more unrelated roles for conflict operations or incompatible operations for corresponding.

Optionally, operations corresponding to the operating behavior include:

authenticating a Node Manager to join a network, viewing a state of a Node Manager, viewing an authorization-application list, viewing a trusted-execution-cluster list, allocating a trusted-execution cluster, authenticating a node role, viewing authorized and unauthorized users, starting a contract, stopping a contract, executing a contract, uploading a contract, downloading a contract, deleting a contract, viewing contract-code statistics, performing static analysis, viewing a contract process, viewing a contract permission, viewing a contract state, viewing a contract log, viewing a node state, viewing a node log, rolling back, making backup, migrating and configuring node information.

Optionally, the detecting the task-operating permission of the contract instance or task instance based on the TBAC module in the R-TBAC model during the running of the contract instance or task instance; if the contract instance or task instance does not have the task-operating permission, applying for or adding, by the contract instance or task instance, the task-operating permission; and if the contract instance or task instance has the task-operating permission, normally running the contract instance or task instance to complete the operation, further includes:

abstracting the contract instance or task instance from a workflow formed by combining different tasks, and granting a task-operating permission corresponding to the contract instance or task instance at runtime, wherein the task-operating permission varies with a context of the contract instance or task instance, and with the execution of the contract instance or task instance, the authorization step changes internal parameters or states through autonomous management, and the states include: a sleep state, an activated state, a valid state, a suspended state and an invalid state; and the tasks are divided according to a "rule of least privilege required when the tasks are executed" and a "rule of separation of duties between tasks".

The embodiments of the disclosure also provide a permission management system for a trustworthiness mechanism of a big-data blockchain, wherein the system includes:

a resource classifying module configured to classify system resources in the big-data blockchain into user-role resources, data resources and node resources in advance;

a role acquiring module configured to monitor a login behavior of a user in an operating system of the big-data blockchain, acquire a current role of the user based on a RBAC module in a R-TBAC model, and acquire an operating-permission-value range of the current role of the user in the big-data blockchain;

a role processing module configured to monitor an operating behavior of the user in the big-data blockchain, and, based on the RBAC module and according to the operating-permission-value range of the current role, detect whether the current role of the user has a role-operating permission for the operation; if the current role of the user does not have the role-operating permission, remind the user to authenticate a corresponding user role according to an operating-permission value required by the operation; and if the current role of the user has the role-operating permission, complete the operation, or create and run a corresponding contract instance or task instance, wherein the contract instance is an access process of the data resources to the node resources, and the task instance is an access process of the user-role resources to the data resources;

a task processing module configured to detect a task-operating permission of the contract instance or task instance based on a TBAC module in the R-TBAC model during running of the contract instance or task instance; if the contract instance or task instance does not have the task-operating permission, apply for or add, by the contract instance or task instance, the task-operating permission; if the contract instance or task instance has the task-operating permission, normally run the contract instance or task instance to complete the operation; and a master control module configured to complete, by the user, the operation in authorized ranges of the role-operating permission and the task-operating permission based on the R-TBAC model; and perform, by the R-TBAC model, authorization management on mapping-relation sets in the model individually based on different dynamic constraint rules designed in advance.

Optionally, the user-role resources include: a Center Manager, a Node Manager, a Smart Contract Instance Manager, a Smart Contract Provider, a Smart Contract User and an Anonymous;

the data resources include: a smart-contract code, a contract instance, contract-runtime information and a smart-contract log; and the node resources include: a CPU, an I/O, a network and a memory.

Optionally, the role acquiring module includes:

a login module configured to detect by using signature authentication of the user whether the user logs in for the first time;

a role allocating module configured to, if the user does not log in for the first time, acquire the current role of the user from a user management database; if the user logs in for the first time, acquiring a session ID and current-public-and-private-key information, determining according to a process of current-public-and-private-key-signature verification that the user is a legal node currently, searching the public key from the user management database, and acquiring the current role of the user; and a role dividing module configured to divide the current role of the user according to the principle of least privilege of roles based on a relationship between functions provided by different users on nodes and a working process, so as to reduce overlapping and omission of operating-permission-value ranges of all roles;

a public-key storing module configured to, if the user management database does not have the public key, store a public key of the user into the user management database and mark the public key as a default current role to acquire the default current role of the user; and deploy the default current role in advance according to a distribution scenario of the big-data blockchain, specifically including: the Center Manager and the Node Manager;

a permission granting module configured to copy the operating-permission value of the current role of the user in the big-data blockchain to the user, so that the current user is capable of performing operations in the operating-permission-value range; and a permission collating module configured to collate the operating-permission-value ranges corresponding to all the roles, so as to reduce the overlapping and omission of the operating-permission-value ranges of all the roles, including: allocating two or more unrelated roles for conflict operations or incompatible operations for corresponding.

Optionally, operations corresponding to the operating behavior include:

authenticating a Node Manager to join a network, viewing a state of a Node Manager, viewing an authorization-application list, viewing a trusted-execution-cluster list, allocating a trusted-execution cluster, authenticating a node role, viewing authorized and unauthorized users, starting a contract, stopping a contract, executing a contract, uploading a contract, downloading a contract, deleting a contract, viewing contract-code statistics, performing static analysis, viewing a contract process, viewing a contract permission, viewing a contract state, viewing a contract log, viewing a node state, viewing a node log, rolling back, making backup, migrating and configuring node information.

Optionally, the task processing module is further configured for:

abstracting the contract instance or task instance from a workflow formed by combining different tasks, and granting a task-operating permission corresponding to the contract instance or task instance at runtime, wherein the task-operating permission varies with a context of the contract instance or task instance, and with the execution of the contract instance or task instance, the authorization step changes internal parameters or states through autonomous management, and the states include: a sleep state, an activated state, a valid state, a suspended state and an invalid state; and the tasks are divided according to a "rule of least privilege required when the tasks are executed" and a "rule of separation of duties between tasks".

It can be seen from the above technical solutions that the embodiments of the disclosure provide the permission management method and system for the trustworthiness mechanism of the big-data blockchain. Based on the requirements of access permission management, the method and system effectively divide the system resources in the big-data blockchain, and make full use of the RBAC module and the TBAC module in the R-TBAC model to control the access between system resources with different dimensions respectively. At the same time, the specific access process and access operating permission are further optimized, which not only guarantees a right to use, a right to yields and a right to dispose of the system resources by a node provider, a data provider and a data user, but also guarantees management and configuration rights of a contract provider and a contract user, realizes the trusted circulation of data in the big-data blockchain, and effectively improves the access accuracy and permission management efficiency of multi-dimensional system resources in the big-data blockchain.

DETAILED DESCRIPTION

The following clearly and completely describes the technical solutions in the embodiments of the disclosure with reference to the accompanying drawings in the embodiments of the disclosure. Apparently, the described embodiments are merely some but not all of the embodiments of the disclosure. Based on the embodiments of the disclosure, all other embodiments obtained by those of ordinary skills in the art without going through any creative work shall fall within the scope of protection of the disclosure.

Based on the field of big data and integrated with a blockchain idea, a big-data blockchain ensures secure and trusted sharing, flow, openness, integration and realization of data assets through a smart trusted operating system of the big data.

Figure 1:
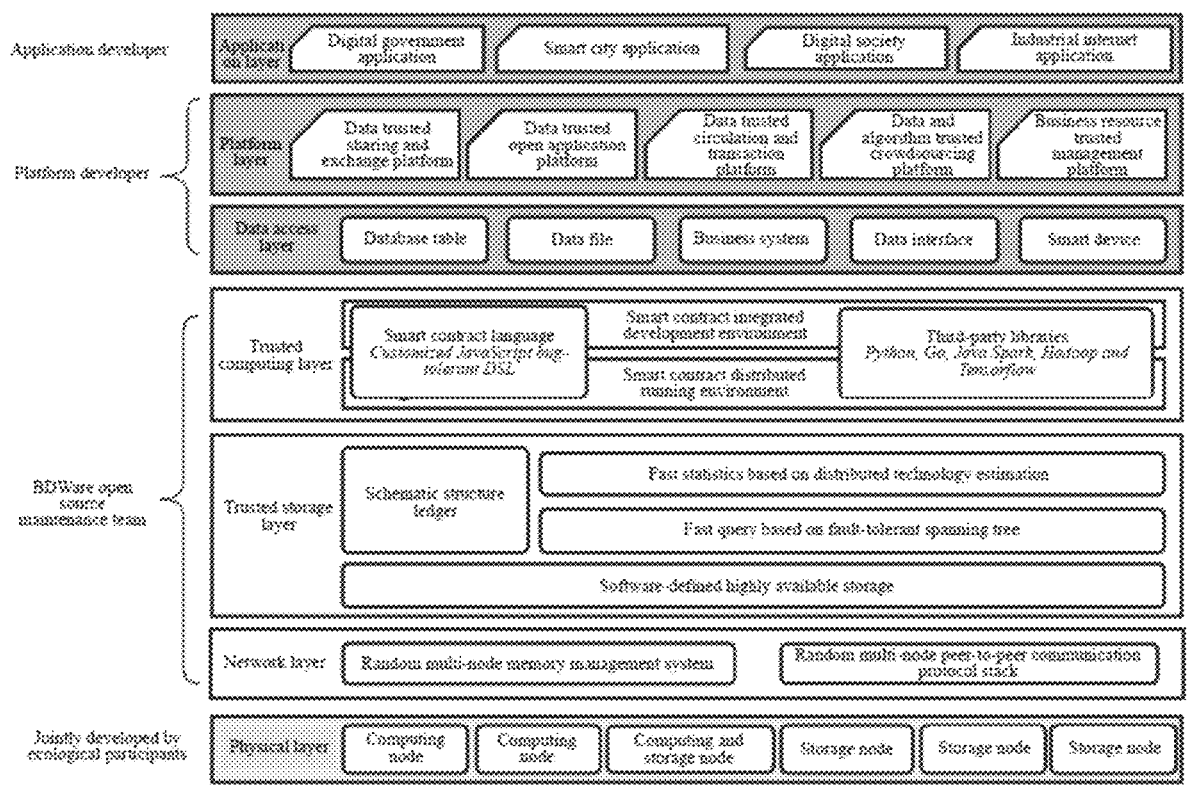
FIG. 1 is a technical architecture diagram of a big-data blockchain system.

FIG. 1 illustrates a technical architecture diagram of a big-data blockchain system, wherein an operation of a trusted computing layer of the big-data blockchain system is based on a trusted smart contract engine technology, trusted computing of random multi-node mutual verification is implemented through a customized smart contract language, and calling an interface of a trusted storage layer to store contract execution process information to the trusted storage layer is supported. Meanwhile, writing instructions and remote interface calling are provided for an upper layer on the basis of self-defined programming language and framework, and the trusted computing and voucher storage can be realized by writing programs according to the framework. The trusted computing layer provides a third-party library calling module of contract development environment, running environment and other programming languages centering on the smart contract language.

With the explosive growth of data, data acquisition methods, data acquisition roles and application scenarios in the big-data blockchain show respective diversities thereof, and a consequent problem is that multi-dimensional data management and access control become more and more difficult.

The earliest concept of the access control originated from a protection technology in multi-layer security means of American registration information, which is label display and authorization protection of sensitive information in objects. In subsequent development, the access control has become an important part of indispensable security measures in a present computer system due to excellent organization and security to resources in the system.

At present, none big-data blockchain applications are provided with an access control mechanism that can realize trusted circulation among various resources. In an embodiment of the disclosure, system resources in a big-data blockchain are divided into three categories including user-role resources, data resources and node resources. Facing the mutual operation among these three resources with different dimensions, different permission management mechanisms are designed based on a R-TBAC access control model. Moreover, various permission management mechanisms are mapped to each other, and each permission management mechanism fully optimizes itself, so as to further improve an access authorization process, carry out efficient and secure permission management, and realize trusted circulation of the data resources in the big-data blockchain.

First Embodiment

Figure 2:
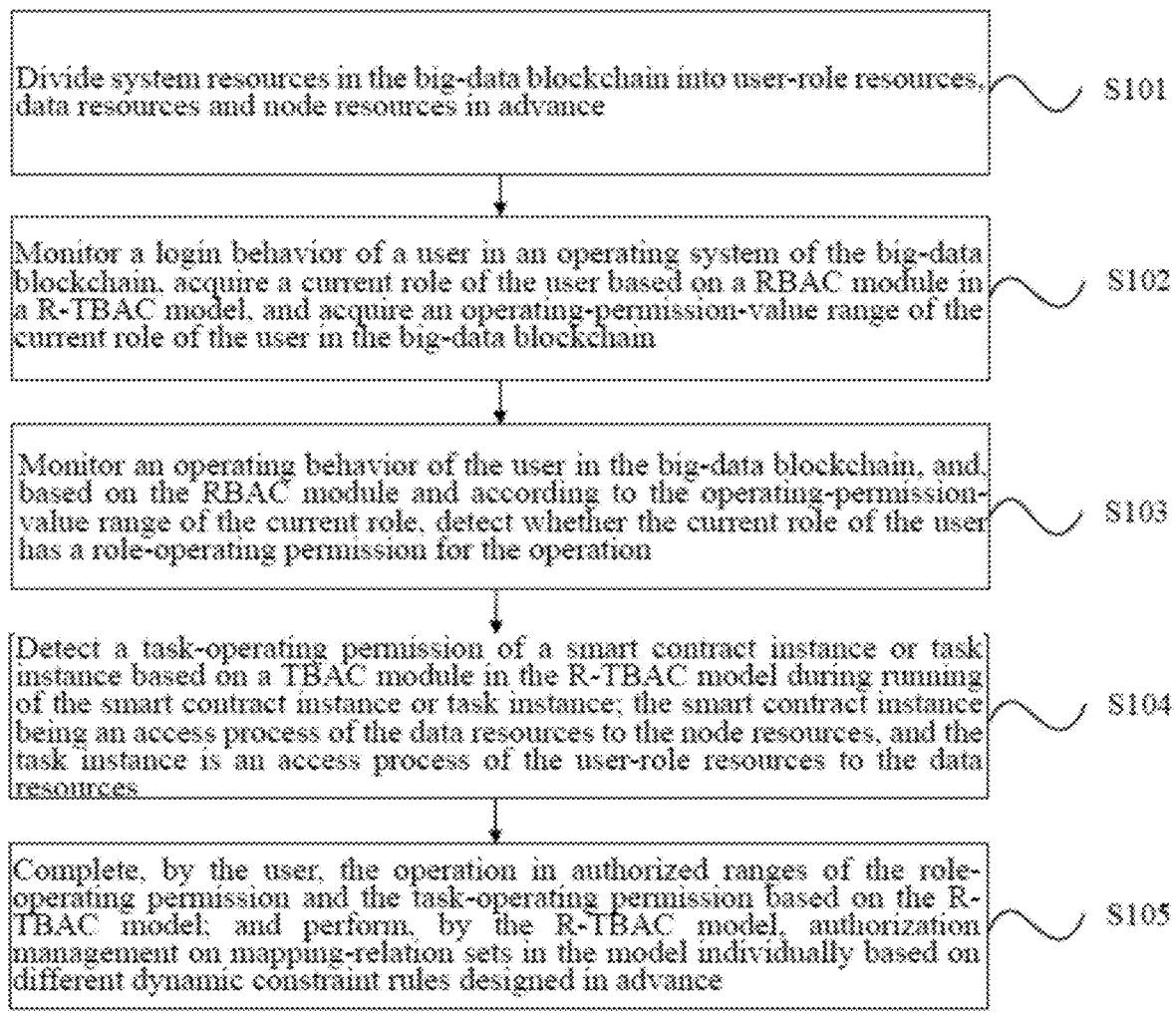
FIG. 2 is a flow chart of steps of a permission management method for a trustworthiness mechanism of a big-data blockchain provided by the disclosure.

FIG. 2 is a flow chart of steps of a permission management method for a trustworthiness mechanism of a big-data blockchain provided by the disclosure.

As shown in FIG. 2, the permission management method for the trustworthiness mechanism provided by the embodiment of the disclosure is applied to the big-data blockchain, specifically including the following steps.

In step S101, system resources in the big-data blockchain are divided into user-role resources, data resources and node resources in advance.

Access control consists of three main elements including a subject, an object and a policy, which are also called triple, and respectively refers to a subject user (Subject), an object resource (Object) and a control policy (Permission). The Subject refers to users or other subsystems that directly access the system; the Object is actually an entity that receives access control, i.e., related operations, data, attributes, and task flows under permission protection in the system; and the permission refers to a collection of workflow operations, generally including two types of operations: authorization or rejection.

In the embodiment of the disclosure, the user-role resources, the data resources and the node resources respectively operate with each other according to the relations between the subject and the object and in accordance with corresponding permissions.

For example, a Node Manager (user-role resources) manages various logs and physical resources (node resource) in the node, a contract instance (data resource) refers to a utility class for using and consuming the node resources, and a contract user (user role resource) statically analyzes a smart-contract code (data resource), and the like.

In the embodiment of the disclosure, the user-role resources can represent an identity of the user to access other resources. For various resources, different identities have different access permissions.

Figure 3:
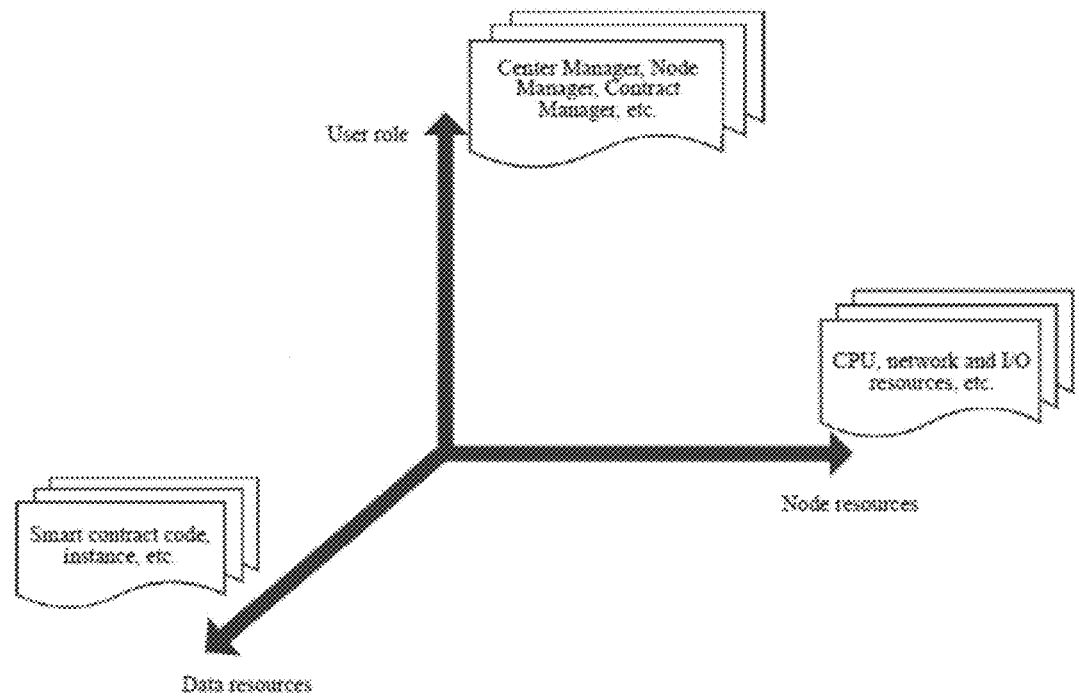
FIG. 3 is a structural diagram of dividing resources of a big-data blockchain system provided by an embodiment of the disclosure.

As shown in FIG. 3, in the embodiment of the disclosure, the user-role resources include: a Center Manager, a Node Manager, a Smart Contract Instance Manager, a Smart Contract Provider, a Smart Contract User and an Anonymous;

the data resources include: a smart-contract code, a contract instance, contract-runtime information and a smart-contract log; and the node resources include: a CPU, an I/O, a network and a memory.

In step S102, a login behavior of a user in an operating system of the big-data blockchain is monitored, a current role of the user is acquired based on a RBAC module in a R-TBAC model, and an operating-permission-value range of the current role of the user in the big-data blockchain is acquired.

The R-TBAC model (Role-Task-Based Access Control) consists of two modules including the RBAC (Role-Based Access Control) module and the TBAC (Task-Based Access Control) module, which not only can implement the role-based access control, but also can implement the task-based access control.

Derived from autonomous access control and mandatory access control, the existing RBAC model innovatively proposes to use the related definitions of roles in the model to set different collections respectively, and realize user permission management based on a many-to-many mapping relation between {users, roles} and {roles, permissions}, that is, an intersection of roles and permissions. The step of the role-based access control is to grant the user a corresponding role, and find a corresponding permission collection through the role. Then the user can implement a series of operations in a scope of the permission collection. In this process, there is no direct mapping relation between the user and the permission, which completes logical separation.

Figure 4:
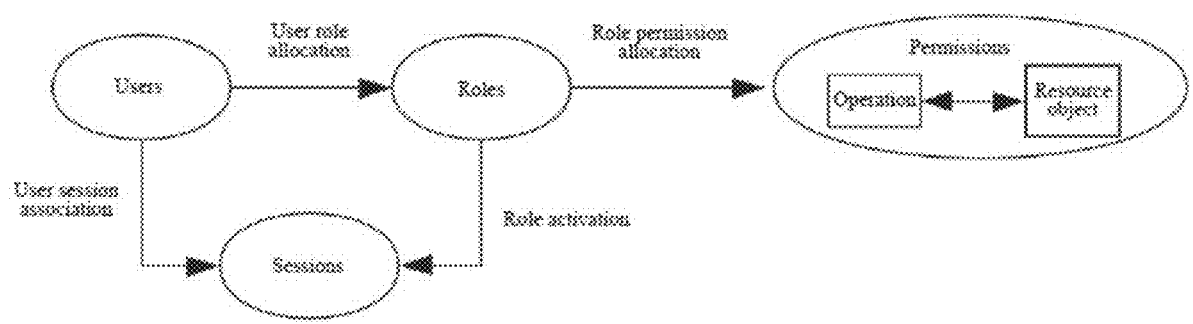
FIG. 4 is a flow diagram of a RBAC module provided by the embodiment of the disclosure.

In the embodiment of the disclosure, a RBAC module in the R-TBAC model is designed. FIG. 4 illustrates a flow diagram of the RBAC module provided by the embodiment of the disclosure.

As shown in FIG. 4, the RBAC module includes the following basic data elements: Users, Roles, Sessions, Operations, Permissions and Resource Objects. The flow chart of the module specifically includes: the Users call the Roles through allocation of the user roles; the Roles call the Permissions through allocation of the role permissions; and the Permissions include the Operations and the Resource Objects; wherein, a correlation relation between the Users and the Sessions is already established. If the user logs in for the first time, it is necessary to acquire a unique session ID and store the session ID in the Sessions; and determine the role of the user through the session ID so as to activate the Roles.

In this embodiment, the session is regarded as a basic flow chart of identity authentication, and a session ID is generated every time the system is used. At the same time, an activation relation between the session and the role may be that multiple sessions are generated by one role, or one role only has one session, and the activation relation depends on how the user uses the sessions and the roles.

In the embodiment of the disclosure, a user signature is used to judge the role, and the role is used to correspond to the permission. The role will be used as a communication interface of a corresponding relation between the user and the permission, which increases a flexibility of the system. A concept of role hierarchy enables a system manager to manage distributed structures, which is more convenient to meet various requirements of permission management.

An embedded model using the access control model is independent and more policy-neutral than other security measures, which can cover the whole system or control database fields through fine-grained control of access resources and operations. Taking a Node Manager logging in a node management center as an example, FIG. 5 illustrates a flow chart of a method for authorizing roles for users provided by the embodiment of the disclosure.

Figure 5:
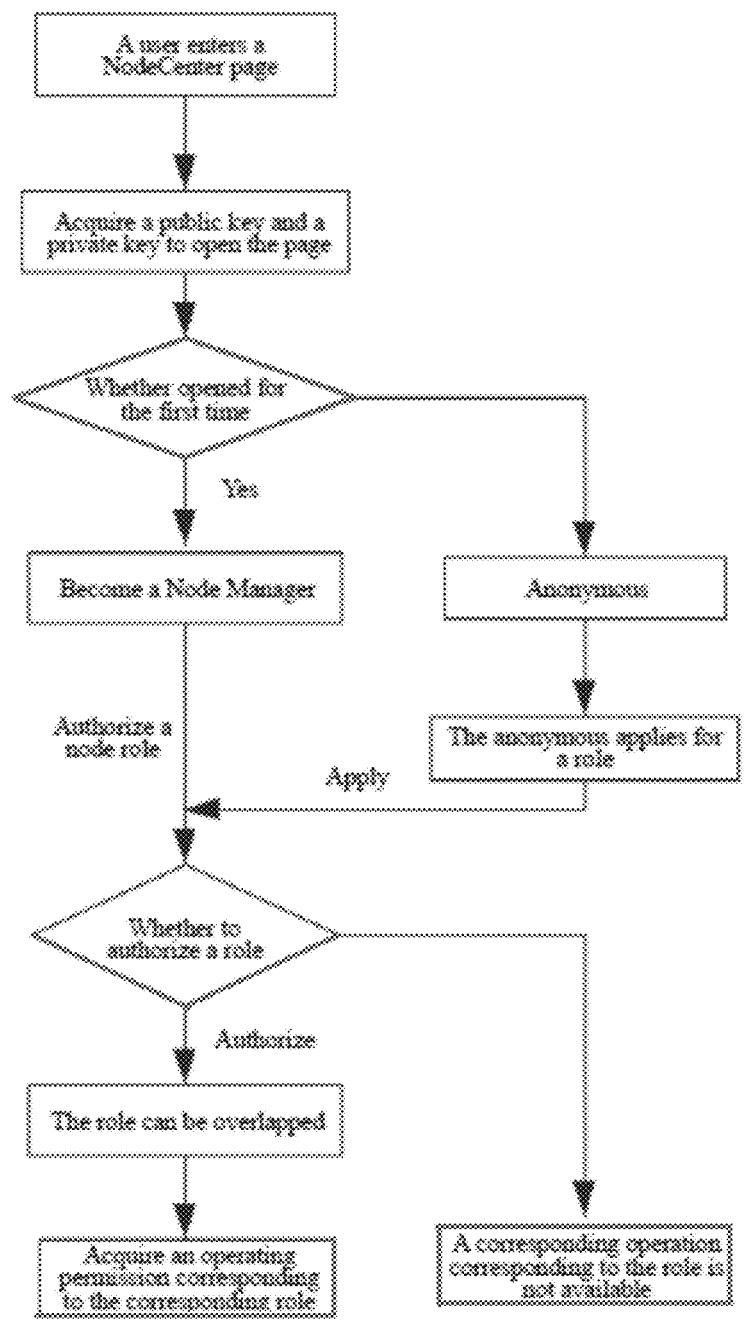
FIG. 5 is a flowchart of a method for authorizing roles for users provided by the embodiment of the disclosure.

As shown in FIG. 5, in the embodiment of the disclosure, the acquiring the current role of the user based on the RBAC module in the R-TBAC model includes the following steps. In step 1, a user is detected to enter a NodeCenter page of a node center, and a public-private key pair to open the page is acquired. In step 2, whether the user opens the page for the first time, i.e., logs in for the first time is detected through signature authentication of the user; if the user does not log in for the first time, the current role of the user is acquired from a user management database; if the user logs in for the first time, a session ID and current-public-and-private-key information are acquired, the user is determined to be a legal node currently according to a process of current-public-and-private-key-signature verification, and then the public key is searched from the user management database, and the current role of the user is acquired. In step 3, if the user management database does not have the public key, a public key of the user is stored into the user management database and marked as a default current role to acquire the default current role of the user, wherein a role of the Node Manager will be acquired through a role of the user logged in the node management center. In step 4, the Node Manager can determine whether to authorize roles of other users. After authorizing the roles, the roles of other users may also be overlapped to acquire an operating permission corresponding to the corresponding role. If the roles are unauthorized, the corresponding operations corresponding to the roles are unavailable.

In the embodiment of the disclosure, logged-in users are verified based on a method of a public-private key pair, i.e., when different users log in, the system uses the public key to verify private key signatures of the users, so as to ensure that the users are currently legal nodes and provide the users with role information corresponding to the users recorded by the public key. Moreover, the operating permission owned by the current role of the user can be shown in addition to showing the current role of the user.

In the embodiment of the disclosure, the current role of the user is divided according to the principle of least privilege of roles based on a relationship between functions provided by different users on nodes and a working process, so as to reduce overlapping and omission of operating-permission-value ranges of all roles.

When each task needs authorization, the principle of least privilege of roles only needs to authorize the role needed by the task, and will not authorize redundant Roles and Permissions, so that each task is controlled to have or be allocated with the minimum Roles and Permissions.

The deploying the default current role in advance according to a distribution scenario of the big-data blockchain, includes: the Center Manager and the Node Manager.

In the embodiment of the disclosure, two sets of front-end pages may be designed in advance, and then respectively provided to two types of user roles including the Center Manager and the Node Manager, for login according to the actual deployment situation of the nodes.'

Figure 6:
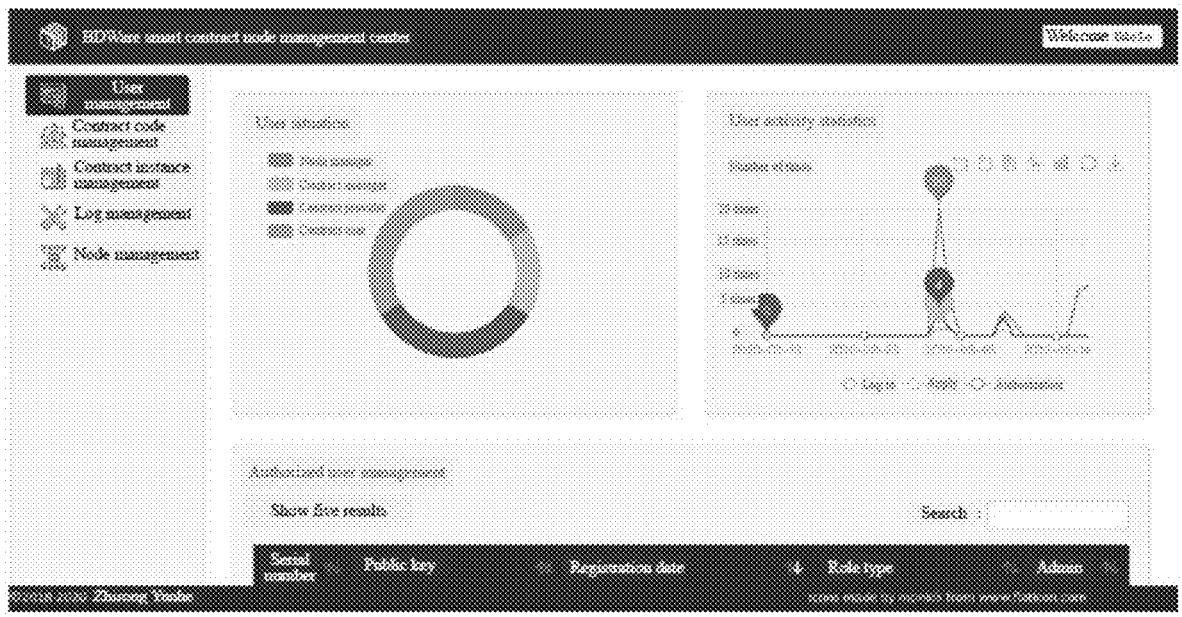
FIG. 6 is a design drawing of a management page portal homepage logged in by a Node Manager provided by the embodiment of the disclosure.

FIG. 6 illustrates a design drawing of a management page portal homepage logged in by the Node Manager provided by the embodiment of the disclosure. As shown in FIG. 6, the Node Manager can manage the users after logging in, including authorizing corresponding roles for the users. The Node Manager can also perform contract code management, contract instance management, log management and node management.

In the embodiment of the disclosure, the acquiring the operating-permission-value range of the current role of the user in the big-data blockchain, includes: copying the operating-permission value of the current role of the user in the big-data blockchain to the current user, so that the current user is capable of performing operations in the operating-permission-value range.

In step 103, an operating behavior of the user in the big-data blockchain is monitored, and whether the current role of the user has a role-operating permission for the operation is detected based on the RBAC module and according to the operating-permission-value range of the current role; if the current role of the user does not have the role-operating permission, the user is reminded to authenticate a corresponding user role according to an operating-permission value required by the operation; and if the current role of the user has the role-operating permission, the operation is completed, or a corresponding contract instance or task instance is created and run, wherein the contract instance is an access process of the data resources to the node resources, and the task instance is an access process of the user-role resources to the data resources.

In a preferred embodiment provided by the disclosure, the collating the operating-permission-value ranges corresponding to all the roles, so as to reduce the overlapping and omission of the operating-permission-value ranges of all the roles, includes: allocating two or more unrelated roles for conflict operations or incompatible operations for corresponding.

Operations corresponding to the operating behavior include: authenticating a Node Manager to join a network, viewing a state of a Node Manager, viewing an authorization-application list, viewing a trusted-execution-cluster list, allocating a trusted-execution cluster, authenticating a node role, viewing authorized and unauthorized users, starting a contract, stopping a contract, executing a contract, uploading a contract, downloading a contract, deleting a contract, viewing contract-code statistics, performing static analysis, viewing a contract process, viewing a contract permission, viewing a contract state, viewing a contract log, viewing a node state, viewing a node log, rolling back, making backup, migrating and configuring node information.

In the embodiment of the disclosure, the authentication of the role of the user is completed by the Center Manager or the Node Manager.

In a preferred embodiment provided by the disclosure, the RBAC module allocates permissions of different atomic granularities to the user-role resources.

Table 1 shows a permission correspondence of the user roles provided by the embodiment of the disclosure.

TABLE 1

| Permission of atomic granularity | Center Manager | Node Manager | Contract Manager | Contract Provider | Contract User |
|---|---|---|---|---|---|
| Authenticating a node manager to join a network | ✓ | | | | |
| Viewing a state of the node manager | ✓ | | | | |
| Viewing an authorization-application list | ✓ | | | | |
| Viewing a trusted-execution-cluster list | ✓ | | ✓ | | |
| Allocating a trusted-execution cluster | ✓ | | ✓ | | |
| Authenticating a node role | | ✓ | | | |
| Viewing authorized and unauthorized users | | ✓ | | | |
| Starting a contract and stopping a contract | | | | | ✓ |

TABLE 1-continued

| Permission of atomic granularity | Center Manager | Node Manager | Contract Manager | Contract Provider | Contract User |
|---|---|---|---|---|---|
| Executing a contract | | | | | ✓ |
| Uploading, downloading and deleting a contract | | | | ✓ | |
| Viewing contract-code statistics | | | | ✓ | ✓ |
| Static analysis | | | | ✓ | ✓ |
| viewing a contract process, permission, state and log | | | | ✓ | ✓ |
| Viewing a node state and log | | ✓ | | | |
| Rolling back, making backup and migrating | | | ✓ | | |
| Configuring node information | | ✓ | | | |

As shown in Table 1, the characters and corresponding permissions of the roles of the users include:

Center Manager: there is a node with a weak center in the big-data blockchain, and signature verification is performed on this node. By default, a person who uses the Center Manager for the first time initializes the center node and becomes the Center Manager. Functions of the Center Manager include allocating a trusted-execution cluster, authorizing a Node Manager to join a blockchain network, i.e., authenticating the Node Manager, and viewing node log information of the whole network, etc.

Node Manager: the Node Manager plays a role that can configure various information of nodes (such as node licence, smart contract compiler address, etc.), and then apply to join the network managed by the Center Manager; authenticate roles of other users in the node, and manage various logs and physical resources in the nodes.

Smart Contract Instance Manager: the Smart Contract Instance Manager can manage published smart contracts, such as starting and stopping a contract process, statically analyzing a smart contract process, making backup and rollback strategies, checking a file size of the smart contract and a memory occupied by the smart contract.

Smart Contract Provider: the Smart Contract Provider can complete writing of the smart-contract codes, adding contract code permissions, uploading and downloading the contract codes, or the like.

Smart Contract User: the Smart Contract User can only use the smart contract, but cannot modify the smart contract, or add and change permissions, but can view runtime logs of the contract.

Anonymous: the Anonymous refers to a node that does not joint the network and is not subjected to any role authentication. Role authentication can be performed on the Anonymous, and the Anonymous can apply to join a certain blockchain network as a Node Manager, but has no other operation permissions.

In the big-data blockchain, some operations on the node resources, including managing the node resources and calling some operations that can be completed without smart contracts, can be completed based on user role information stored in the public key in the user database. In the embodiment of the disclosure, the RBAC module detects whether the current role of the user has the role-operating permission for the operation and acquires role-based authorization to complete these operations. For operations that can only be completed by using the data resources of the smart contract, including the access of the data resources to the node resources and the access of the user-role resources to the data resources, it is necessary to create and run a corresponding contract instance or task on the premise that the current role of the user has the role operation permission; wherein the contract instance is an access process of the data resources to the node resources, and the task instance is an access process of the user-role resources to the data resources, so as to further authorize the access based on a specific tasks through the TBAC module.

Figure 7:
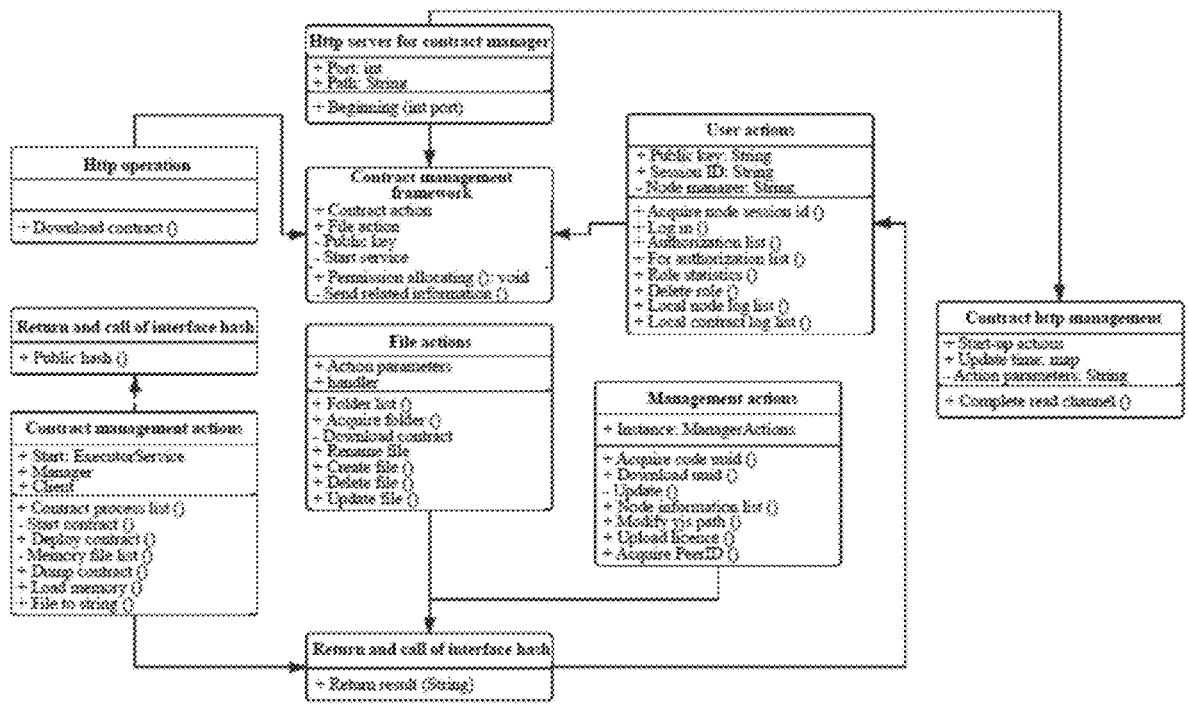
FIG. 7 is a UML class diagram for access control based on RBAC provided by the embodiments of the disclosure.

FIG. 7 illustrates a UML class diagram for access control based on RBAC provided by the embodiment of the disclosure. As shown in FIG. 7, the UML class diagram completes the authentication of the current role of the user through the design of the contract manager, contract management framework and user actions; and the node resources are used on the basis of roles through file actions and management actions.

In step S104, a task-operating permission of the contract instance or task instance is detected based on a TBAC module in the R-TBAC model during running of the contract instance or task instance; if the contract instance or task instance does not have the task-operating permission, the contract instance or task instance applies for or adds the task-operating permission; and if the contract instance or task instance has the task-operating permission, the contract instance or task instance is normally run to complete the operation.

The access control performed by the TBAC module is mainly aimed to the tasks in self-use, and permission management is carried out through the tasks and task states of the system, as well as whether the subject or object for the access control of the user has access control permissions. For the whole TABC model, access permissions are not static, but change with a running context of the system, so the TABC model is also called an active security model. In the TBAC model, permission management is carried out in a form of workflow, wherein the workflow refers to the same business flow formed by a plurality of related work tasks when a certain requirement is completed. The TBAC model is actually aimed to an information protection permission problem for every workflow. In a working environment, the processing of data and operations in each step is closely related to the previous processing process, so should a task-based access control process. Therefore, the permission management of the TBAC model is related to the context information. In addition, the TBAC model can not only have different permission mechanisms for different workflows, but also have different permission mechanisms for the same workflow, so the TBAC model also has the character of performing permission management based on instances.

TBAC is usually expressed by a quintuple form of (O,S,P,L,AS), wherein O represents Object, S represents Subject, P represents an authorization step, which may be understood as a basic module for authorization; AS represents an activated permission, and L (LifeCycle) represents a life cycle, indicating a life cycle of the activated permission AS.

TBAC is a time-efficient model. Tasks are time-limited; therefore, every authorized user also has a time limit in access control, so the user has the corresponding access permissions only when performing the tasks. In this way, a corresponding relation between the operating permission of the user and the task and a synchronous execution effect are ensured. The activated permission AS under the authorization step P is represented by symbols, and the life cycle at this time is the life cycle of the authorization step under the activated permission AS. However, before the authorization step is activated, a state of protection and a role of permission cannot be brought into play. The Subject can be granted with the relevant applied permissions by the Object only when the relevant permission operating value has been activated by the authorization step, and meanwhile, the life cycle of the permission is to be timed, and the authorized tasks can be executed at will within a time range permitted by the LifeCycle. When the LifeCycle is over, everything will be restored to the state without authorization before, i.e., the related information authorized before will lose an operating ability. Task-based access control is authorized by dynamic management, and contents and internal components in the system are arranged by a system manager. Therefore, TBAC needs to design differently according to different aspects in the state of each task, which depends on a non-static execution process of basic tasks of each workflow.

The embodiment of the disclosure provides a formal definition inside the TBAC module, wherein the formal definition includes a workflow Wf, Au (Authorization Unit), Users T, and Permissions P.

Figure 8:
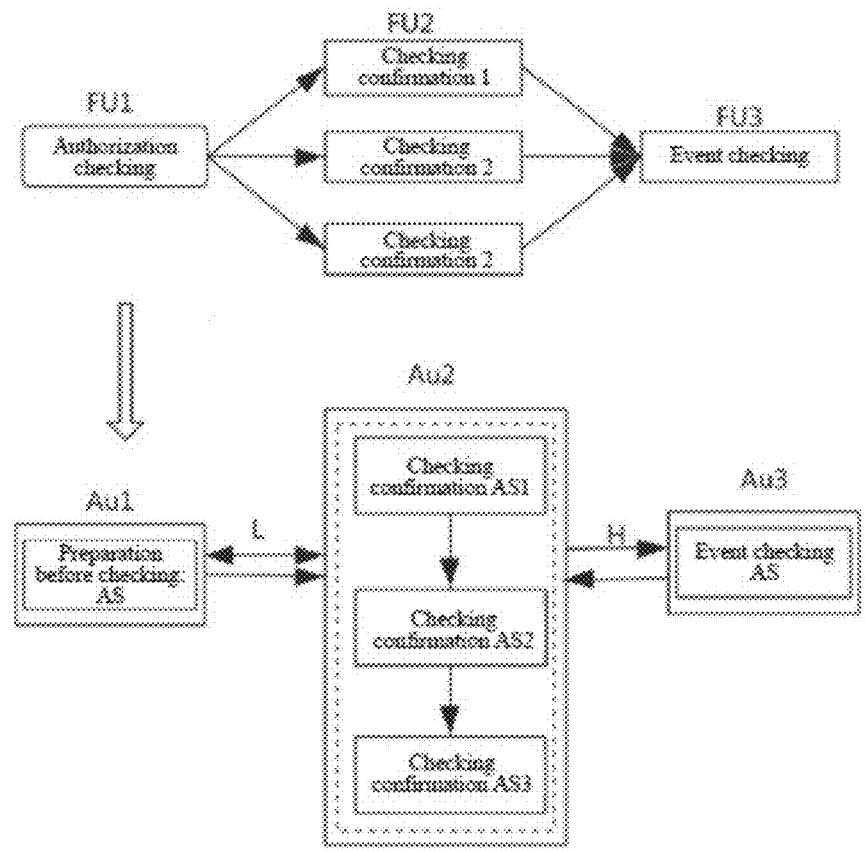
FIG. 8 is a flowchart of a TBAC method based on formal definition provided by the embodiment of the disclosure.

FIG. 8 illustrates a flowchart of a TBAC method based on the formal definition provided by the embodiment of the disclosure. As shown in FIG. 8, the workflow Wf includes a plurality of FU (flow unit) flow units, that is, the workflow Wf may be regarded as being composed of a series of Authorization Units Au.

It should be noted that Fu1 performs authorization checking, which checks requirements of the tasks on qualifications and abilities of task performers, i.e., verifies that the current role executing the tasks has corresponding role-operating permission by checking a mapping relation between the roles and the operations. After passing the verification, next step is performed to check the AS permission and check the task-operating permission in sequence.

An internal relation of the Authorization Units Au is: $Au \times Au \subseteq 2E$, D={order dependence, failure dependence, decentralization dependence, and agency dependence}; moreover, a relation between the Authorization Units Au and the Users T is 1:n, Au→R, which is a function of selecting an execution principal from T={R1, R2, R3 . . . }: $Au \times Au \subseteq 2$, D={order dependence, failure dependence, decentralization dependence, and agency dependence}; and, a relation between the Authorization Units Au and the Permissions P is 1:n, F(Au, R)→P, R→P, R∈T, P∈T, P={p1, p2, p3 . . . } is the Permissions, and F is a permissions function of an initialization executor; G(Au, p1)→p2, p1∈p, p2=p−p1, wherein G is a permission recession function.

The order dependence means that AS2 can only be activated after AS1 is completed; the failure dependence means that AS2 can only be activated after AS1 fails; the decentralization dependence means that AS1 and AS2 have to be run by different users; the agent dependence indicates that the permission of AS1 may be granted to AS2 when AS1 is suspended.

In the embodiment of the disclosure, the method specifically includes: abstracting the contract instance or task instance from a workflow formed by combining different tasks, and granting a task-operating permission corresponding to the contract instance or task instance at runtime, wherein the task-operating permission varies with a context of the contract instance or task instance, and with the execution of the contract instance or task instance, the authorization step changes internal parameters or authorization states through autonomous management.

Figure 9:
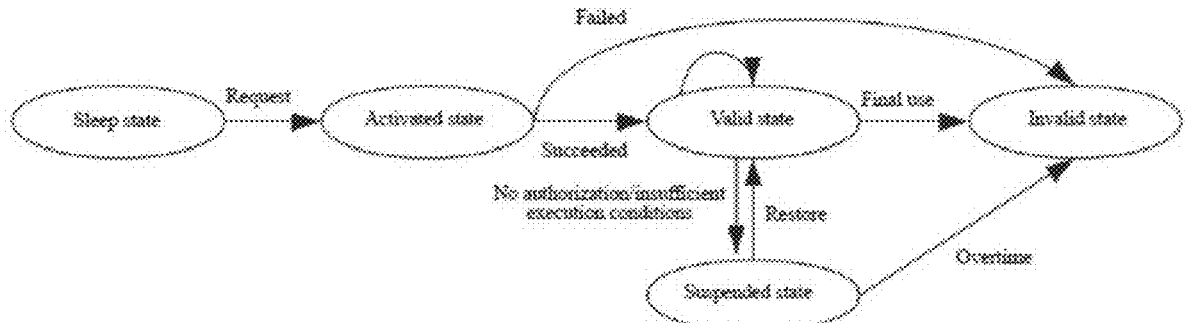
FIG. 9 is a flow chart illustrating migration and change of a TBAC authorization state provided by the embodiment of the disclosure.

FIG. 9 is a flow chart illustrating migration and change of a TBAC authorization state provided by the embodiment of the disclosure. As shown in FIG. 9, the authorization state provided by the embodiment of the disclosure has the following meanings:

(1) sleep state: this is a state where the authorization step has not been generated, in other words, this is an initial state;

(2) activated state: a state where the authorization step has been generated, but has not yet been activated, waiting for an authorization step request to be activated;

(3) valid state: a state where the authorization step has been activated and started to execute, and a state of the protected task will change at this time;

(4) suspended state: representing a state that the activated authorization step is rejected to execute due to inconformity with the related task permission, and then the task process is forced to suspend; the suspended state may become a valid state if the permission conditions are met, or may be determined as an invalid process probably because the suspension time is too long, and the life cycle is ended; and (5) invalid state: the state of the authorization step has no practical meaning in the system, and the entire process may be ended and the invalid state at this time may be deleted.

In a preferred embodiment provided by the disclosure, the tasks are divided according to a "rule of least privilege required when the tasks are executed" and a "rule of separation of duties between tasks".

The tasks are executed by using Least Privilege Rule, that is, the permission will be given to the corresponding user when the operation is executed, and the permission will be withdrawn automatically when the permission is not needed in a certain step. Separation of duty is employed between the tasks, that is, mutually exclusive tasks cannot be included in the same task operation or workflow, i.e., tasks are independent of each other, and task duties do not interfere with each other. Therefore, permissions to all the tasks are also detected independently.

Based on the above two principles, a process will be created for permission checking only when the contract instance or task instance is running, so that the user does not directly have the permission to consume a certain resource, but only has the permission to access resources in the process of executing the contract or task. Moreover, the Authorization Units operate independently to activate different authorization states. Such a process ensures real-time synchronization between the task execution process and the checking process for authorization, and an authorization mechanism will also fail when the task instance is ended, so that the authorization will not be abused for malicious consumption.

In step S105, the user completes the operation in authorized ranges of the role-operating permission and the task-operating permission based on the R-TBAC model; and the R-TBAC model performs authorization management on various mapping relation collections in the model respectively based on different dynamic constraint rules designed in advance.

Figure 10:
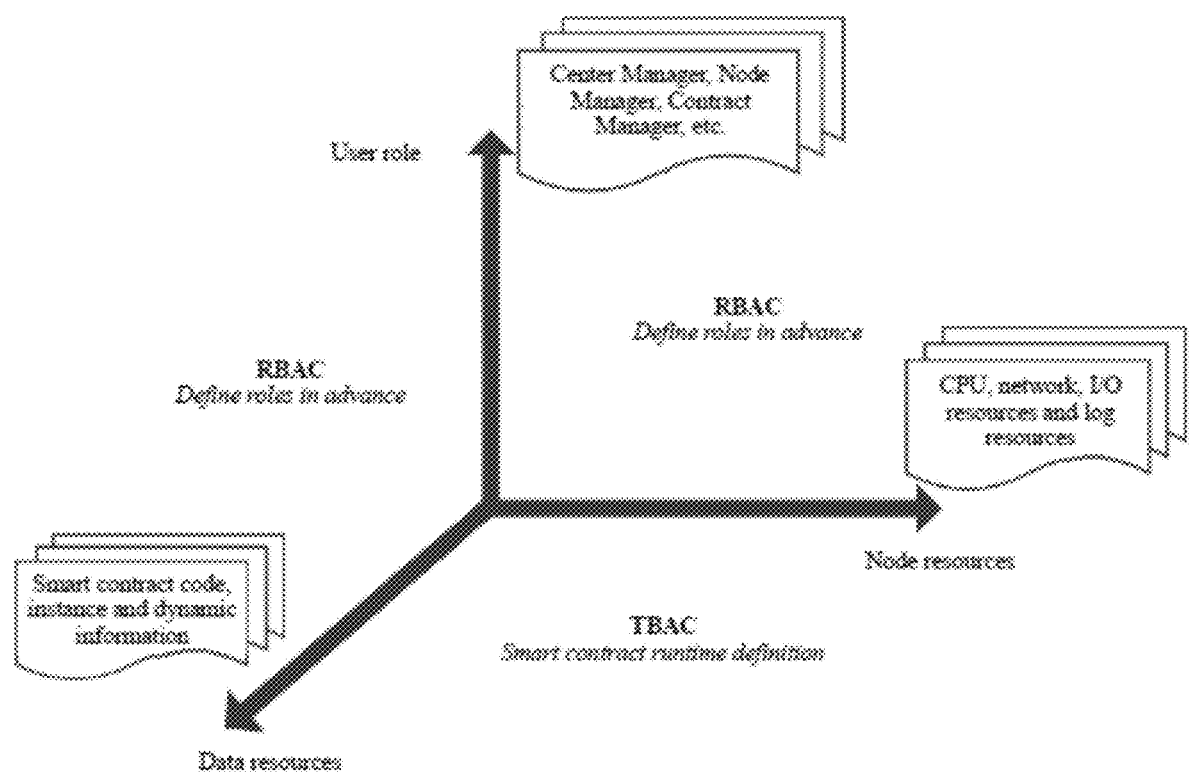
FIG. 10 is a structural diagram of performing authorization management on system resources with different dimensions provided by the embodiment of the disclosure.

FIG. 10 is a structural diagram of performing authorization management on system resources with different dimensions provided by the embodiment of the disclosure. As shown in FIG. 10, in the embodiment of the disclosure, under the premise of effectively dividing the system resources of the big-data blockchain, different access control mechanisms are used for different system resources based on the highly customized R-TBAC model, and a mapping collection of corresponding permission relations is established based on an operating relation between the system resources to achieve efficient and secure access permission management.

In the embodiment of the disclosure, the R-TBAC model also supports a data abstraction principle when managing and allocating permissions, that is, some data or resources in the system need to be abstracted during a modeling process, but a specific abstraction process and a specific abstraction degree are designed by different systems independently. There will be no mandatory requirements, and a security manager may close configuration items in the model that support these principles.

The embodiment of the disclosure discloses a dynamic constraint rule which can be applied to the R-TBAC model. Based on different dynamic constraint rules, authorization management is carried out on various mapping relation collections in the model, so as to avoid abuse of permission, prevent meaningless consumption of the node resources and improve a security of the system at the same time.

Since each workflow is composed of different tasks, if each task is a certain item in the tasks of the workflow, a certain workflow can only correspond to one user, so the tasks in these workflows all correspond to the same user. The tasks in one task instance, i.e., the tasks in the workflow are represented by t1, t2, t3 . . . ti. The workflow corresponding to the task instance is represented by BT, the current user is represented by u, and u(ti) represents that the user u has completed the task ti. Then, the dynamic rules of the entire task-based access control are described as follows:

Dynamic constraint rule 1: when the role performing the current operation is consistent with a predefined role: $r(t) \wedge u(r) \Rightarrow u(ti)$, wherein r(t) represents the current role when performing the operation, u(r) represents the user predefined to perform the current operation by the user, and the user can perform the task only when the current role of the user performing the operation is the same as the specified role or contained in the specified role.

Dynamic constraint rule 2: during an operation process of a contract, the same user is not allowed to perform conflicting operations: $(ti1 \subseteq Wti)(ti2 \subseteq Wti) \wedge (t \subseteq CT) \Rightarrow u(ti1) \neq u(ti2)$, wherein Wti represents contract operations, ti1 and ti2 are two conflicting operations in conflicting tasks, and users performing the operations ti1 and ti2 are different users.

Operations of the contract include an operation of the contract on the node resources (the corresponding access process is a contract instance) and an operation of the contract on the contract itself.

Dynamic constraint rule 3: in a contract instance, conflicting users cannot perform conflicting operations: $(ti1)2(1) \wedge (u1 \subseteq Cu) \wedge (u2 \in Cu) \Rightarrow (1 \in CT) \wedge (t2 \notin CT)$, wherein ti1 is a task instance of task t1 and ti2 is a task instance of task t2.

In the embodiment of the disclosure, based on different characteristics of mutual operations among various system resources in the big-data blockchain, the system resources in the big-data blockchain are divided into the user-role resources, the data resources and the node resources, and the RBAC module and the TBAC module in the R-TBAC model are fully utilized to respectively control the access between the system resources with different dimensions, and further optimize the specific access process and access operation permission, realize the trusted circulation of the data in the big-data blockchain, and effectively improve the access accuracy and permission management efficiency of multi-dimensional system resources in the big-data blockchain, and ensure the security of the data.

It should be noted that, for the sake of simple description, the method embodiments are all expressed as a series of action combinations, but those skilled in the art should understand that the embodiments of the disclosure are not limited by the described action sequences, because certain steps may be performed in other sequences or concurrently according to the embodiments of the disclosure. Secondly, those skilled in the art should also understand that the embodiments described in the specification are all preferred embodiments, and the actions involved are not necessarily required by the embodiments of the disclosure.

Second Embodiment

Figure 11:
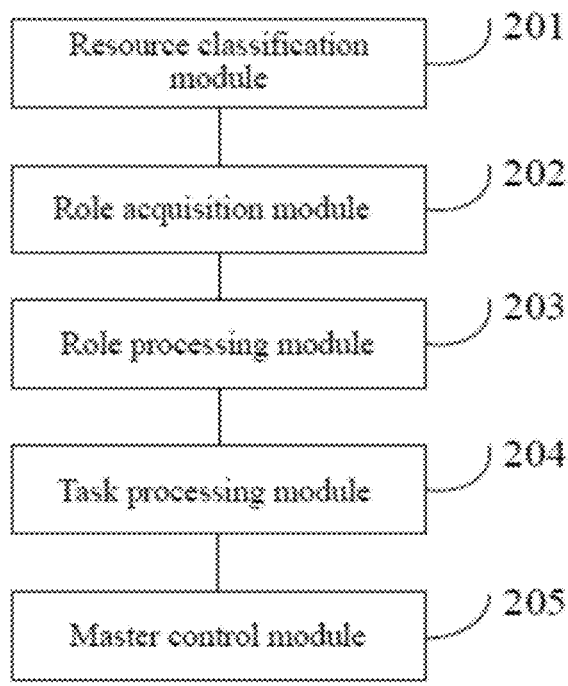
FIG. 11 is a structural block diagram of a permission management system for a trustworthiness mechanism of a big-data blockchain provided by an embodiment of the disclosure.

FIG. 11 illustrates a structural block diagram of a permission management system for a trustworthiness mechanism of a big-data blockchain according to the disclosure. As shown in FIG. 11, the system may be applied to a big-data blockchain, and the system specifically includes the following modules.

A resource classifying module 201 is configured to classify system resources in the big-data blockchain into user-role resources, data resources and node resources in advance.

Access control consists of three main elements including a subject, an object and a policy, which are also called triple, and respectively refers to a subject user (Subject), an object resource (Object) and a control policy (Permission). The Subject refers to a user or other subsystem that directly access the system; the Object is actually an entity that receives access control, i.e., related operations, data, attributes, and task flows under permission protection in the system; and the permission refers to a collection of workflow operations, generally including two types of operations: authorization or rejection.

In the embodiment of the disclosure, the user-role resources can represent an identity of the user to access other resources. For various resources, different identities have different access permissions, specifically including: a Center Manager, a Node Manager, a Smart Contract Instance Manager, a Smart Contract Provider, a Smart Contract User and an Anonymous;

wherein the data resources include: a smart-contract code, a contract instance, contract-runtime information and a smart-contract log; and the node resources include: a CPU, an I/O, a network and a memory.

A role acquiring module 202 is configured to monitor a login behavior of a user in an operating system of the big-data blockchain, acquire a current role of the user based on a RBAC module in a R-TBAC model, and acquire an operating-permission-value range of the current role of the user in the big-data blockchain.

In the embodiment of the disclosure, the role acquiring module 202 includes:

a login module 2021 configured to detect by using signature authentication of the user whether the user logs in for the first time;

a role allocating module 2022 configured to, if the user does not log in for the first time, acquire the current role of the user from a user management database; if the user logs in for the first time, acquire a session ID and current-public-and-private-key information, determine according to a process of current-public-and-private-key-signature verification that the user is a legal node currently, search the public key from the user management database, and acquire the current role of the user; and a role dividing module 2023 configured to divide the current role of the user according to the principle of least privilege of roles based on a relationship between functions provided by different users on nodes and a working process, so as to reduce overlapping and omission of operating-permission-value ranges of all roles;

a public-key storing module 2024 configured to, if the user management database does not have the public key, store a public key of the user into the user management database and mark the public key as a default current role to acquire the default current role of the user; and deploy the default current role in advance according to a distribution scenario of the big-data blockchain, specifically including: the Center Manager and the Node Manager;

a permission granting module 2025 configured to copy the operating-permission value of the current role of the user in the big-data blockchain to the current user, so that the current user is capable of performing operations in the operating-permission-value range; and a permission collating module 2026 configured to collate the operating-permission-value ranges corresponding to all the roles, so as to reduce the overlapping and omission of the operating-permission-value ranges of all the roles, including: allocating two or more unrelated roles for conflict operations or incompatible operations for corresponding.

In the embodiment of the disclosure, logged-in users are verified based on a method of a public-private key pair, i.e., when different users log in, the system uses the public key to verify private key signatures of the users, so as to ensure that the users are currently legal nodes and provide the users with role information corresponding to the users recorded by the public key. Moreover, the operating permission owned by the current role of the user can be shown in addition to showing the current role of the user.

In the embodiment of the disclosure, two sets of front-end pages may be designed in advance, and then respectively provided to two types of user roles including the Center Manager and the Node Manager, for login according to the actual deployment situation of the nodes.

A role processing module 203 is configured to monitor an operating behavior of the user in the big-data blockchain, and, based on the RBAC module and according to the operating-permission-value range of the current role, detect whether the current role of the user has a role-operating permission for the operation; if the current role of the user does not have the role-operating permission, remind the user to authenticate a corresponding user role according to an operating-permission value required by the operation; and if the current role of the user has the role-operating permission, complete the operation, or create and run a corresponding contract instance or task instance, wherein the contract instance is an access process of the data resources to the node resources, and the task instance is an access process of the user-role resources to the data resources.

In a preferred embodiment provided by the disclosure, the collating the operating-permission-value ranges corresponding to all the roles, so as to reduce the overlapping and omission of the operating-permission-value ranges of all the roles, includes: allocating two or more unrelated roles for conflict operations or incompatible operations for corresponding.

Operations corresponding to the operating behavior include: authenticating a Node Manager to join a network, viewing a state of a Node Manager, viewing an authorization-application list, viewing a trusted-execution-cluster list, allocating a trusted-execution cluster, authenticating a node role, viewing authorized and unauthorized users, starting a contract, stopping a contract, executing a contract, uploading a contract, downloading a contract, deleting a contract, viewing contract-code statistics, performing static analysis, viewing a contract process, viewing a contract permission, viewing a contract state, viewing a contract log, viewing a node state, viewing a node log, rolling back, making backup, migrating and configuring node information.

In the embodiment of the disclosure, the authentication of the role of the user is completed by the Center Manager or the Node Manager.

In a preferred embodiment provided by the disclosure, the RBAC module allocates permissions of different atomic granularities to the user-role resources, which are shown in Table 1 above.

A task processing module 204 is configured to detect a task-operating permission of the contract instance or task instance based on a TBAC module in the R-TBAC model during running of the contract instance or task instance; if the contract instance or task instance does not have the task-operating permission, apply for or add, by the contract instance or task instance, the task-operating permission; and if the contract instance or task instance has the task-operating permission, normally run the contract instance or task instance to complete the operation.

In the embodiment of the disclosure, the contract instance or task instance is abstracted from a workflow formed by combining different tasks, and a task-operating permission corresponding to the contract instance or task instance at runtime is granted, wherein the task-operating permission varies with a context of the contract instance or task instance, and with the execution of the contract instance or task instance, the authorization step changes internal parameters or states through autonomous management, and the states include: a sleep state, an activated state, a valid state, a suspended state and an invalid state.

The tasks are divided according to "rule of least privilege required when the tasks are executed" and a "rule of separation of duties between tasks".

The tasks are executed by using Least Privilege Rule, that is, the permission will be given to the corresponding user when the operation is executed, and the permission will be withdrawn automatically when the permission is not needed in a certain step.

Separation of duty is employed between the tasks, that is, mutually exclusive tasks cannot be included in the same task operation or workflow, i.e., tasks are independent of each other, and task duties do not interfere with each other. Therefore, permissions to all the tasks are also detected independently.

Based on the above two principles, a process will be created for permission checking only when the contract instance or task instance is running, so that the user does not directly have the permission to consume a certain resource, but only has the permission to access resources in the process of executing the contract or task. Such a process ensures real-time synchronization between the task execution process and the checking process for authorization, and an authorization mechanism will also fail when the task instance is ended, so that the authorization will not be abused for malicious consumption.

A master control module 205 is configured to complete, by the user, the operation in authorized ranges of the role-operating permission and the task-operating permission based on the R-TBAC model; and perform, by the R-TBAC model, authorization management on mapping-relation sets in the model individually based on different dynamic constraint rules designed in advance.

The embodiment of the disclosure discloses a dynamic constraint rule which can be applied to the R-TBAC model. Based on different dynamic constraint rules, authorization management is carried out on various mapping relation collections in the model, so as to avoid abuse of permission, prevent meaningless consumption of the node resources and improve a security of the system at the same time.

In the embodiment of the disclosure, based on different characteristics of mutual operations among various system resources in the big-data blockchain, the system resources in the big-data blockchain are divided into the user-role resources, the data resources and the node resources, and the RBAC module and the TBAC module in the R-TBAC model are fully utilized to respectively control the access between the system resources with different dimensions, and further optimize the specific access process and access operation permission, realize the trusted circulation of the data in the big-data blockchain, and effectively improve the access accuracy and permission management efficiency of multi-dimensional system resources in the big-data blockchain, and ensure the security of the data.

The embodiments in the disclosure are all described step by step, the important part of each embodiment mainly lies in the difference between other embodiments, and the same or similar part between each embodiment may be referred to each other.

Those skilled in the art will appreciate that embodiments of the disclosure may be provided as a method, an apparatus, or a computer program product. Therefore, the embodiments of the disclosure may take the form of complete hardware embodiments, complete software embodiments or software-hardware combined embodiments. Moreover, the embodiments of the disclosure may take the form of a computer program product embodied on one or more computer usable storage media (including but not limited to disk storage, CD-ROM, optical storage, etc.) in which computer usable program codes are included.

The disclosure is described with reference to the flow charts and/or block diagrams of the method, terminal device (system), and computer program products according to the embodiments of the disclosure. It should be appreciated that each flow and/or block in the flow charts and/or block diagrams, and combinations of the flows and/or blocks in the flow charts and/or block diagrams may be implemented by computer program instructions. These computer program instructions may be provided to a general purpose computer, a special purpose computer, an embedded processor, or a processor of other programmable data processing terminal device to produce a machine for the instructions executed by the computer or the processor of other programmable data processing terminal device to generate a device for implementing the functions specified in one or more flows of the flow chart and/or in one or more blocks of the block diagram.

These computer program instructions may also be provided to a computer readable memory that can guide the computer or other programmable data processing terminal device to work in a given manner, so that the instructions stored in the computer readable memory generate a product including an instruction device that implements the functions specified in one or more flows of the flow chart and/or in one or more blocks of the block diagram.

These computer program instructions may also be loaded to a computer, or other programmable terminal device, so that a series of operating steps are executed on the computer, or other programmable terminal device to produce processing implemented by the computer, so that the instructions executed in the computer or other programmable terminal device provide steps for implementing the functions specified in one or more flows of the flow chart and/or in one or more blocks of the block diagram.

Although the preferred embodiments of the disclosure have been described, those skilled in the art can make additional changes and modifications to these embodiments once they know the basic inventive concepts. Therefore, the appended claims are intended to be interpreted as including the preferred embodiments and all the changes and modifications that fall within the scope of the embodiments of the disclosure.

Finally, it should be also noted that relational terms herein such as first and second, etc., are used merely to distinguish one entity or operation from another entity or operation, and do not necessarily require or imply there is any such relationship or order between these entities or operations. Furthermore, the terms "including", "comprising" or any variations thereof are intended to embrace a non-exclusive inclusion, such that a process, method, article, or terminal device including a plurality of elements includes not only those elements but also includes other elements not expressly listed, or also incudes elements inherent to such a process, method, item, or terminal device. In the absence of further limitation, an element defined by the phrase "including a . . . " does not exclude the presence of additional identical element in the process, method, article, or terminal device.

The trusted permission management method for the trustworthiness mechanism of the big-data blockchain and the permission management system for the trustworthiness mechanism of the big-data blockchain provided by the disclosure are described in detail above. Specific examples are applied to explain the principle and implementation of the disclosure herein. The above embodiments are only used to help understand the method of the disclosure and the core idea thereof. Meanwhile, for those of ordinary skills in the art, there will be changes in the specific implementation and application scope according to the idea of the disclosure. To sum up, the contents of this specification should not be construed as limiting the disclosure.

The invention claimed is:

1. A permission management method for a trustworthiness mechanism of a big-data blockchain, comprising the following steps:
   classifying system resources in the big-data blockchain into user-role resources, data resources and node resources in advance;
   monitoring a login behavior of a user in an operating system of the big-data blockchain, acquiring a current role of the user based on a role-based access control (RBAC) module in a role-task-based access control (R-TBAC) model, and acquiring an operating-permission-value range of the current role of the user in the big-data blockchain;
   monitoring an operating behavior of the user in the big-data blockchain, based on the RBAC module and according to the operating-permission-value range of the current role, detecting whether the current role of the user has a role-operating permission for the operating behavior;

when the current role of the user does not have the role-operating permission, according to an operating-permission value required by the operating behavior, reminding the user to authenticate a user role corresponding to the operating behavior; and when the current role of the user has the role-operating permission, completing the operating behavior, or creating and running a contract instance or a task instance corresponding to the operating behavior, wherein the contract instance is an access process of the data resources to the node resources, and the task instance is an access process of the user-role resources to the data resources;

detecting a task-operating permission of the contract instance or the task instance based on a task-based access control (TBAC) module in the R-TBAC model during running of the contract instance or the task instance;

when the contract instance or the task instance does not have the task-operating permission, applying for or adding, by the contract instance or the task instance, the task-operating permission; and when the contract instance or the task instance has the task-operating permission, normally running the contract instance or the task instance to complete the operating behavior; and completing, by the user, the operating behavior in authorized ranges of the role-operating permission and the task-operating permission based on the R-TBAC model; and performing, by the R-TBAC model, authorization management on mapping-relation sets in the R-TBAC model individually based on different dynamic constraint rules designed in advance;

wherein the step of monitoring the login behavior of the user in the operating system of the big-data blockchain, acquiring the current role of the user based on the RBAC module in the R-TBAC model, and acquiring the operating-permission-value range of the current role of the user in the big-data blockchain comprises:

detecting, by using signature authentication of the user, whether the user logs in for a first time; when the user does not log in for the first time, acquiring the current role of the user from a user management database;

when the user logs in for the first time, acquiring a session ID and current-public-and-private-key information, determining, according to a process of current-public-and-private-key-signature verification, that the user is a legal node currently, searching a public key from the user management database, and acquiring the current role of the user; and dividing the current role of the user according to a principle of least privilege of a plurality of roles based on a relationship between functions provided by different users on nodes and a working process, to reduce overlapping and omission of operating-permission-value ranges of the plurality of roles; and when the user management database does not have the public key, storing the public key of the user into the user management database and marking the public key of the user as a default current role to acquire the default current role of the user; and deploying the default current role in advance according to a distribution scenario of the big-data blockchain, wherein the default current role comprises a Center Manager and a Node Manager;

copying the operating-permission value of the current role of the user in the big-data blockchain to the user, wherein the user performs operations in the operating-permission-value range; and a step of collating the operating-permission-value ranges corresponding to the plurality of roles to reduce the overlapping and the omission of the operating-permission-value ranges of the plurality of roles comprises: allocating at least two unrelated roles for conflict operations or incompatible operations for corresponding.

2. The permission management method according to claim 1, wherein the user-role resources comprise: a Center Manager, a Node Manager, a Smart Contract Instance Manager, a Smart Contract Provider, a Smart Contract User and an Anonymous User;

the data resources comprise: a smart-contract code, the contract instance, contract-runtime information and a smart-contract log; and the node resources comprise: a CPU, an input/output (I/O), a network and a memory.

3. The permission management method according to claim 1, wherein operations corresponding to the operating behavior comprise:

authenticating a Node Manager to join a network, viewing a state of the Node Manager, viewing an authorization-application list, viewing a trusted-execution-cluster list, allocating a trusted-execution cluster, authenticating a node role, viewing an authorized user and an unauthorized user, starting a contract, stopping a contract, executing a contract, uploading a contract, downloading a contract, deleting a contract, viewing contract-code statistics, performing a static analysis, viewing a contract process, viewing a contract permission, viewing a contract state, viewing a contract log, viewing a node state, viewing a node log, rolling back, making backup, and migrating and configuring node information.

4. The permission management method according to claim 1, wherein the step of detecting the task-operating permission of the contract instance or the task instance based on the TBAC module in the R-TBAC model during the running of the contract instance or the task instance;

when the contract instance or the task instance does not have the task-operating permission, applying for or adding, by the contract instance or the task instance, the task-operating permission; and when the contract instance or task instance has the task-operating permission, normally running the contract instance or the task instance to complete the operating behavior, comprises:

abstracting the contract instance or the task instance from a workflow formed by combining different tasks, and granting the task-operating permission corresponding to the contract instance or the task instance at runtime, wherein the task-operating permission varies with a context of the contract instance or the task instance, and the task-operating permission varies with an execution of the contract instance or the task instance, an authorization step changes internal parameters or states through autonomous management, wherein the states comprise: a sleep state, an activated state, a valid state, a suspended state and an invalid state; and the different tasks are divided according to a "rule of least privilege required when the different tasks are executed" and a "rule of separation of duties between the different tasks".

5. A permission management system for a trustworthiness mechanism of a big-data blockchain, comprising:
a memory for storing instructions for executing:
a resource classifying module, a role acquiring module, a role processing module, a task processing module, and a master control module;
wherein the resource classifying module is configured to classify system resources in the big-data blockchain into user-role resources, data resources and node resources in advance;
the role acquiring module is configured to monitor a login behavior of a user in an operating system of the big-data blockchain, acquire a current role of the user based on a RBAC module in a R-TBAC model, and acquire an operating-permission-value range of the current role of the user in the big-data blockchain;
the role processing module is configured to monitor an operating behavior of the user in the big-data blockchain, based on the RBAC module and according to the operating-permission-value range of the current role, detect whether the current role of the user has a role-operating permission for the operating behavior;
when the current role of the user does not have the role-operating permission, remind the user to authenticate a user role corresponding to the operating behavior according to an operating-permission value required by the operating behavior; and
when the current role of the user has the role-operating permission, complete the operating behavior, or create and run a contract instance or a task instance corresponding to the operating behavior, wherein the contract instance is an access process of the data resources to the node resources, and the task instance is an access process of the user-role resources to the data resources;
the task processing module is configured to detect a task-operating permission of the contract instance or the task instance based on a TBAC module in the R-TBAC model during running of the contract instance or the task instance;
when the contract instance or the task instance does not have the task-operating permission, apply for or add, by the contract instance or the task instance, the task-operating permission; and
when the contract instance or the task instance has the task-operating permission, normally run the contract instance or the task instance to complete the operating behavior; and
the master control module is configured to complete, by the user, the operating behavior in authorized ranges of the role-operating permission and the task-operating permission based on the R-TBAC model; and
perform, by the R-TBAC model, authorization management on mapping-relation sets in the R-TBAC model individually based on different dynamic constraint rules designed in advance;
wherein the role acquiring module comprises:
a login module, a role allocating module, a role dividing module, a public-key storing module, a permission granting module, and a permission collating module;
wherein the login module is configured to detect, by using signature authentication of the user, whether the user logs in for a first time;
the role allocating module is configured to, when the user does not log in for the first time, acquire the current role of the user from a user management database;
when the user logs in for the first time, acquire a session ID and current-public-and-private-key information, determine, according to a process of current-public-and-private-key-signature verification, that the user is a legal node currently, search a public key from the user management database, and acquire the current role of the user;
the role dividing module is configured to divide the current role of the user according to a principle of least privilege of a plurality of roles based on a relationship between functions provided by different users on nodes and a working process, to reduce overlapping and omission of operating-permission-value ranges of all of the plurality of roles;
the public-key storing module is configured to, when the user management database does not have the public key, store the public key of the user into the user management database and mark the public key of the user as a default current role to acquire the default current role of the user; and
deploy the default current role in advance according to a distribution scenario of the big-data blockchain, wherein the default current role comprises a Center Manager and a Node Manager;
the permission granting module is configured to copy the operating-permission value of the current role of the user in the big-data blockchain to the user, wherein the current user performs operations in the operating-permission-value range; and
the permission collating module is configured to collate the operating-permission-value ranges corresponding to all of the plurality of roles, to reduce the overlapping and the omission of the operating-permission-value ranges of all of the plurality of roles, wherein the permission collating module is further configured to allocate at least two unrelated roles for conflict operations or incompatible operations for corresponding.

6. The permission management system according to claim 5, wherein the user-role resources comprise:
a Center Manager, a Node Manager, a Smart Contract Instance Manager, a Smart Contract Provider, a Smart Contract User and an Anonymous User;
the data resources comprise: a smart-contract code, the contract instance, contract-runtime information and a smart-contract log; and
the node resources comprise: a CPU, an I/O, a network and a memory.

7. The permission management system according to claim 5, wherein operations corresponding to the operating behavior comprise:
authenticating a Node Manager to join a network, viewing a state of the Node Manager, viewing an authorization-application list, viewing a trusted-execution-cluster list, allocating a trusted-execution cluster, authenticating a node role, viewing an authorized user and an unauthorized user, starting a contract, stopping a contract, executing a contract, uploading a contract, downloading a contract, deleting a contract, viewing contract-code statistics, performing a static analysis, viewing a contract process, viewing a contract permission, viewing a contract state, viewing a contract log, viewing a node state, viewing a node log, rolling back, making backup, and migrating and configuring node information.

8. The permission management system according to claim 5, wherein the task processing module is configured for:

abstracting the contract instance or the task instance from a workflow formed by combining different tasks, and granting the task-operating permission corresponding to the contract instance or the task instance at runtime, wherein the task-operating permission varies with a context of the contract instance or the task instance, and the task-operating permission varies with an execution of the contract instance or the task instance, an authorization step changes internal parameters or states through autonomous management, wherein the states comprise: a sleep state, an activated state, a valid state, a suspended state and an invalid state; and the different tasks are divided according to a "rule of least privilege required when the different tasks are executed" and a "rule of separation of duties between the different tasks".

* * * * *